Figure 1:
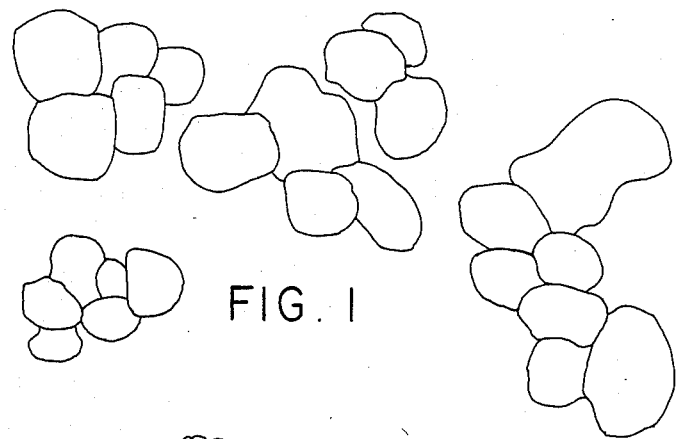

United States Patent [19]

Körsgen et al.

[11] Patent Number: 4,510,305

[45] Date of Patent: Apr. 9, 1985

[54] PROCESS FOR THE PRODUCTION OF POLYPROPYLENE POWDERS

[75] Inventors: Hans H. Körsgen, Praroman-le Mouret; Wolfgang Weller, Bulle, both of Switzerland

[73] Assignee: Coathylene S.A., Fribourg, Switzerland

[21] Appl. No.: 564,655

[22] Filed: Dec. 22, 1983

Related U.S. Application Data

[63] Continuation of Ser. No. 369,295, Apr. 16, 1982, abandoned, which is a continuation of Ser. No. 157,700, Jun. 9, 1980, abandoned, which is a continuation of Ser. No. 957,946, Nov. 6, 1968, abandoned, which is a continuation of Ser. No. 801,449, May 27, 1977, abandoned, which is a continuation of Ser. No. 682,547, May 3, 1976, abandoned, which is a continuation of Ser. No. 523,284, Nov. 13, 1974, abandoned, which is a continuation of Ser. No. 446,884, Feb. 28, 1974, abandoned, which is a continuation of Ser. No. 777,565, Nov. 21, 1968, abandoned.

[30] Foreign Application Priority Data

Nov. 21, 1967 [AT] Austria ............................ 10518/67

[51] Int. Cl.$^3$ .................. C08F 6/00; C08G 00/00; C08J 3/00

[52] U.S. Cl. ............................ 528/494; 528/491; 528/495; 528/496; 528/502; 528/503

[58] Field of Search ............ 528/494, 495, 496

[56] References Cited

U.S. PATENT DOCUMENTS 2,870,113 1/1959 Jones .................. 528/494 X
3,008,946 11/1961 Rhodes et al. ........ 528/496 X
3,154,530 10/1964 Mullen ................ 260/94.9
3,971,749 7/1976 Blunt ................. 528/502 X

FOREIGN PATENT DOCUMENTS 934811 8/1963 United Kingdom ............ 528/491

Primary Examiner—Joseph L. Schofer
Assistant Examiner—S. Babajko
Attorney, Agent, or Firm—Sprung Horn Kramer & Woods

[57] ABSTRACT

Polypropylene powder is produced by dissolving polypropylene in a solvent mixture at an elevated temperature, cooling the solution to below about 80° while maintaining it in quiescent condition for precipitation of the polypropylene as particles which are composed of polypropylene grains, separating the precipitate, drying, and subjecting the dry particles to mechanical comminution.

14 Claims, 3 Drawing Figures

PROCESS FOR THE PRODUCTION OF POLYPROPYLENE POWDERS

This is a continuation of application Ser. No. 369,295, filed Apr. 16, 1982, now abandoned, which in turn is a continuation of Ser. No. 157,700 filed 6/9/80, now abandoned, which in turn is a continuation of Ser. No. 957,946 filed 11/6/68, now abandoned, which in turn is a continuation of Ser. No. 801,449 filed 5/27/77, now abandoned which in turn is a continuation of Ser. No. 682,547 filed 5/3/76, now abandoned, which in turn is a continuation of Ser. No. 523,284 filed 11/13/74, now abandoned, which in turn is a continuation of Ser. No. 446,884 filed 2/28/74, now abandoned, which in turn is a continuation of Ser. No. 777,565 filed 11/21/68, now abandoned.

This invention relates to a new process for the production of polypropylene powders, in particular to those powders which are in a dry, pourable form.

There is, at the moment, an increasing demand for such powders in a wide range of particle sizes. This process allows such powders to be produced on a large industrial scale.

Many methods have been proposed for converting synthetic polymers, particularly hydrocarbon polymers of the polyethylene or polypropylene type, into finely divided powders. Two basic types of comminution have been used. A number of methods use mechanical comminution is conventional or in specially designed grinding assemblies. A considerable amount of the synthetic plastic powders used today is obtained in this way. However, the disadvantages of this method when applied to polyethylene or propylene polymers are also known. The comparative toughness of the polymers makes it necessary to use special techniques to obtain satisfactory grinding. Thus, for example, the material must be kept cool while grinding. The grinding operation produces small particles of the plastic which have a sharp-edged, angular, irregular structure. This means that the ground product tends not to be free flowing, at least when working with very small particle sizes. However, the free flowing properties are very important in practice. This is particularly important in processes in which the powders are spread out in a very thin layer which is then to be fused to form a coherent film.

Because of these disadvantages, the second type of comminution of such synthetic plastics has been developed by industry. In this second case, a physico-chemical method is used. In this kind of method, the polymer is dissolved in a suitable solvent or solvent mixture and is then re-precipitated from the solvent. Those processes which employ both solvents and non-solvents for the particular type of polymer used have become particularly important in practice. For example, it has often been proposed to dissolve the hydrocarbon polymers in a compound which is called the solvent, (i.e. in a compound which when hot adequately dissolves the introduced polymer) at an elevated temperature, and then to emulsify this solution in a non-solvent which is immiscible with the solvent, e.g. in water or organic non-solvent compounds. The polymer is then obtained in the form of fine solidified droplets by subsequent removal of the solvent. Other proposals describe the use of miscible solvents and non-solvents for the polymer used. Thus, it has been recommended, e.g., to dissolve the polymer in the solvent and then to add the non-solvent while stirring mechanically until below the precipitation limit for the dissolved polymer.

A process which has proved suitable for large scale industrial use is one in which polyethylene, particularly high-pressure polyethylene, is dissolved in a mixture of miscible solvents and non-solvents at an elevated temperature and in which the polymer is re-precipitated from this solution. This precipitation can either be effected by cooling the heated mixture or by extracting the liquid mixture from the solution, for example, by distillation. Depending on the quantity of non-solvent used, it is possible, in this case, to regulate successfully the fineness of the particles. During the distillation of the liquids, the liquids and polymer are kept in motion.

The last mentioned is only intended for use with polyethylenes. However, many other processes imply that polyethylene, and in particular high-pressure polyethylene, is equivalent to polypropylene. Accordingly, it is alleged that polyethylene and polypropylene behave in the same way in these physico-chemical processes. However, this statement is incorrect, at least in respect of high molecular weight polypropylenes which are available in large quantities and which have been produced by polymerisation at low or only slightly raised pressures, e.g. in the presence of Ziegler catalysts. In this matter, variations in the product arise not only because of the very much higher molecular weight of the polypropylene when compared with the conventional high-pressure polyethylene but also because of the higher viscosity and necessarily lower concentration of the polymer solutions which are used. Investigations have shown that the processes which are known for use with polyethylene simply cannot be used with small variations when working with polypropylene. Hence, it is not surprising that even now new proposals for the preparation of polypropylene are being made, although high-pressure polyethylene has been available in extremely fine powder form which has been obtained by physico-chemical methods, for more than a decade.

The typical difficulties which are experienced with polypropylene when working up using solutions in solvents and non-solvents, but which do not occur at all with polyethylene, are as follows. When polyethylene is precipitated in the presence of non-solvents from solution, unattached discrete polyethylene particles are formed, which particles can then also be obtained as a dry product. However, a similar effect does not occur with polypropylene. For example, if polypropylene is dissolved in a mixture of solvents and non-solvents or even if it is dissolved in a solvent and then a non-solvent is added, and then if it is attempted to obtain the precipitated product in dry form, normally a powder is not obtained, but a non-pulverous lumpy mass. It is particularly striking that the smallest mechanical movement of the polypropylene solution when precipitation is occurring produces precipitation products which cohere to form filaments or tough skins. Such filaments or skins are not even as finely divided as the starting material which is usually granular. When using polyethylene, mechanical movement and intimate mixing are used during working up and this results in discrete particles of uniform dimensions. However, with polypropylene, in spite of the presence of the non-solvent in the precipitation mixture, this leads to the formation of a large cohering lump. This can only be redissolved with great difficulty.

As a result of this, no technically useful method has yet been published for working up a relatively coarse polypropylene starting material into a fine powder with a grain size distribution which can be substantially controlled and, in particular, to powders with an average particle size which is below 100μ, advantageously below 74μ.

An object of the invention is to provide such a process which can be applied technically. It is based on the idea of combining in a novel manner elements taken from the mechanical comminution method and from the physico-chemical solvent methods.

The process of the invention is based on the surprising discovery that a coarse polypropylene starting material, which cannot as such be ground with conventional grinding apparatus or can only be ground at great expense, can be converted by a pretreatment with solvents or a solvent mixture into a form which, although not finely divided, exhibits quite different properties when ground when compared with the starting material. The polypropylene which has been pretreated according to the invention can, when dry, be ground very simply and cheaply into a finely powdered and freely flowing, pourable material. It is possible to control substantially the particle size of the finished product by adjusting the processing conditions during the pretreatment and the conditions during the subsequent mechanical comminution.

The new process is based on the surprising fact that by dissolving a polypropylene starting material of any desired coarseness in a solvent which can either be one or more solvents for polypropylene, but is in particular a mixture of solvents and non-solvents for polypropylene, and by subsequently re-precipitating the polypropylene from such a solution under specific conditions, a precipitated material which has a novel structure is obtained. The structure of these intermediate products which are formed in the process according to the invention can be termed as a more or less strongly bonded agglomeration of preformed individual particles of the polypropylene. If these agglomerates are supplied in the dry state to a conventional comminuting apparatus, then these agglomerates are broken up and are thus transformed into smaller particles. Grinding of the polypropylene in the conventional sense, i.e. breaking up the individual preformed particles, it is unnecessary. When the ground material is examined under a microscope, it is seen that the agglomerate initially obtained according to the invention is broken away at the bonding positions of the preformed particles during the mechanical grinding. Obviously substantially smaller forces are needed to effect this than for the normal grinding of the coarse starting material. The products which are formed are also outstanding because of the granule structure of the product, which produces the required pouring or trickling capacity of the material.

Accordingly, the invention provides a process for the production of finely divided polypropylene powders which comprises the following steps:
 (a) dissolving polypropylene in one or more solvents at an elevated temperature;
 (b) cooling this solution or allowing it to cool under quiescent conditions, that is in the absence of mechanical agitation or disturbance so that the polypropylene re-precipitates;
 (c) separating the precipitated polypropylene from the liquid phase and drying it; and
 (d) subjecting the dried polypropylene to mechanical comminution.

One of the most important discoveries is that in the new process no mechanical movement of the liquid must occur while the dissolved polypropylene is precipitating.

The grain structures which are important for the subsequent grinding process are best obtained when the solution is kept quite still during the precipitation phase. Thus, not only should, for example, stirring or any other mechanical movement of the mixture in this phase be avoided, but precautions should preferably be taken to exclude as far as possible motion caused by the action of heat from outside. In one preferred embodiment of the invention, the polypropylene starting material is firstly dissolved in the solvent at elevated temperature and then transferred while in solution into a second vessel which is unheated or only gently heated. Care should be taken at this time to see that heat losses which usually occur during the transfer, e.g. on running into the cooling vessel, do not result in a re-precipitation of the polypropylene. In the preferred form of the process according to the invention, the clear solution is allowed to settle and remain completely steady in the cooling vessel and is then allowed to solidify in this state. Polypropylene which precipitates from moving liquid are transformed into filamentary or skin-like products which can not be ground. Motion produced by liquid convection or even by vapour formation caused by external heating leads to the formation of these undesired precipitation products. Hence, for this reason, it is recommended to transfer the polypropylene to the cooling vessel while still in solution.

This transformation of the precipitate into a form which cannot be ground apparently only occurs within a quite restricted temperature range. When the precipitation of the polypropylene is effected by cooling the hot solution, the critical temperature range starts with the onset of the precipitation of the polypropylene. The critical phase has usually already been passed through when a mass temperature of 70° to 80° is obtained in the precipitation product. Mechanical movement, once the temperature is at or below this limit, is also immaterial. Provided the required grain structure has been formed by this time, then filament formation is not caused by any subsequent mechanical movement. Hence, the stillness required during the precipitation thus applies particularly in the temperature range from 80° to 120° C.

In general, therefore the process of the invention comprises the following sequence of steps:
 (1) Dissolution,
 (2) Precipitation,
 (3) Separation of the liquid phase,
 (4) Drying,
 (5) Mechanical comminution,
 (6) Screening according to particle sizes if required.

The following details are given regarding each of these steps of the process:

(1) Dissolution

It is possible to use a conventional organic solvent as the solvent for polypropylene or also a mixture of such solvents. It has surprisingly been found that the precipitation of the polypropylene from a pure solvent phase, while maintaining the required conditions, produces grain structures which, when dry, can be easily ground. The separate granules of these structures are, however, very large when compared with the preferred embodiment which is discussed below and it is not possible to affect the size of the granules by altering the solvent alone. If the process is carried our carefully, it is possible to obtain a product which, in the subsequent grinding operation, can be ground to give a product in which a considerable percentage of grain sizes are below $100\mu$, particularly below $74\mu$.

It is possible to obtain a very much larger variation in the grain sizes by using a mixture of solvents and non-solvents for the polypropylene instead of only a solvent for the dissolving operation. The solvents and non-solvents should at least be miscible with one another in the proportions in which they are used. Which compounds are "solvents" and which are "non-solvents" for polypropylene is well known in the art. Solvents are those compounds which are able to dissolve considerable quantities of the polypropylene at elevated temperatures, which are usually above 100° to 120° C., while the non-solvents are those compounds which are unable to dissolve any substantial quantities of the polypropylene, even above these temperatures. Neither solvents nor non-solvents dissolve any considerable quantity of the polypropylene at room temperature. Typical examples of such solvents are halogenated aliphatic or aromatic hydrocarbon compounds. For many reasons, polyhalogenated aliphatic hydrocarbon compounds of the perchlorethylene type or chlorinated benzenes, for example monochlorobenzene, are preferred. It is desirable that the liquids which are used should have a boiling point under normal pressure above 115° C., and preferably above 135° C. When using liquids which satisfy this condition, the polypropylene can be dissolved at atmospheric pressure. Liquids of lower boiling point, the use of which is not excluded in principle, require pressurised vessels in order to keep the solvents in the liquid phase at the higher processing temperatures. The desiderata given for the solvents apply also to the boiling points of the non-solvents. For example, glycol derivatives are very suitable, and half-ethers of ethylene glycol can be used to advantage.

There is no upper limit to the boiling range for the solvents and/or non-solvents. Nevertheless, for general reasons, it is preferred to use liquids having a boiling point below approximately 300° C. under normal pressure. The choice of such liquids is desirable in that it is possible to purify these liquids which are being repeatedly used, as required by distillation.

It has been found that the primary grain structure of the material which is to be ground becomes finer in grain as more non-solvent is used relative to the solvent. It is possible by altering the solvent to non-solvent ratio to adjust the fineness of the primary grain structure produced and hence to have some influence on the grain sizes which are finally obtained after grinding. However, it should be noted that an additional influence is provided by the grinding operation. The structure of the individual grains (primary grain structure) in the agglomerate is always so small that it is unnecessary, to achieve the required small particle size, for the grain agglomerates to be completely broken down into the individual grains. It is probable that this is not possible technically. Hence, the final product consists of clusters of grains (secondary grain structure) which can be seen under the microscope. However, these are so small that macroscopically they have the required particle size. It has consequently been found that the behaviour during grinding can be controlled by variation of the solvent to non-solvent ratio and thus the particle size can be controlled by this ratio. It is preferred to use solvent/non-solvent ratios of 45 to 95 parts by weight of solvent to 55 to 5 parts by weight of non-solvent. The ratio preferably lies in the range from 60 to 80 parts by weight of solvent to 40 to 20 parts by weight of non-solvent.

When working only with solvents, the simple breaking up of the agglomerates leads to powders with particle sizes between 50 and $400\mu$, with a not inconsiderable proportion above $100\mu$, particularly above $74\mu$. If a solvent/non-solvent ratio of 50:50 is used, then agglomerates with an extremely fine grain structure are formed. These agglomerates can be broken up comparatively easily, but obviously adhere to one another more firmly than grain agglomerates which are produced, e.g., using a solvent/non-solvent ratio of 70:30. The grain families or clusters which are then obtained are built up from granules, the size of which lies between that of the grain precipitated from the pure solvent and the ultra-fine grain which is obtained from a mixture of equal parts of solvent and non-solvent. The difference in diameter of the granules from the said two extreme cases amounts to approximately 10 to 20 times. However, the granules precipitated in the medium solvent ratio range of about 70:30 and the grain clusters which are formed can be broken down particularly easily on subsequent mechanical comminution in a mill and lead very easily to extremely fine powders.

The ratio between the solvent (solvent or solvent/non-solvent mixture) and the quantity of polypropylene used is not of great importance. Obviously as only the actually dissolved proportions of the polypropylene can be worked up in the process according to the invention, it is therefore preferable to use at least enough liquid phase to ensure that the polypropylene is completely dissolved. In practice, it has been found that at least 10 liters of liquid should be used per 1 kg of solid material. An upper limit is only dictated for reasons of cost. Usually the upper practical limit is a ratio of 1:15, i.e. 15 liters of liquid per 1 kg of polypropylene. However, it is obvious that larger quantities, for example up to 1:20, are not excluded.

The solvent temperature is normally above 100° C. Best results are produced using solvent temperatures in the range between 120° and 140° C.

(2) The Precipitation

The conditions prevailing during this stage which are essential for the success of the process according to the invention have already been discussed in detail.

The gel block which is forming while the solution remains at rest can be destroyed after passing through the temperature critical range, i.e. below about 80° C., usually by mechanical means, e.g. by stirring, in order to facilitate the subsequent processing stages, without having destroyed the formation of the required agglomerate in fine grain structure.

(3) Separation of the Liquid Phase

In this stage of the process, the auxiliary liquid introduced should be recovered as completely as possible, and a phase separation between the liquid and the solid phases effected. The phase separation between the precipitate and liquid phase can, e.g., be carried out in a centrifuge. To assist the phase separation, it may be desirable to destroy the upper structure of the formed gel by stirring so that it gives up as much as possible of the trapped liquid during the centrifuging operation. More liquid fractions may be added to the gel in order to destroy the top structure of the gel more readily. If desired, at this stage the primarily formed grain clusters may be broken up by intensive mixing of the gel. This is not necessary, since the dry product is always ground afterwards. In this stage of the phase separation, as much as possible of the solvent/non-solvent mixture should be extracted from the material. It is possible to dry the gel to below 10%, residual solvent. If larger quantities of the solvent mixture are left in the material, then unless additional steps are used for purification, the precipitation product agglomerates again, despite the presence of non-solvent, to form larger pieces and in time forms relatively hard lumps which subsequently cannot be broken up mechanically.

The solvent or solvent mixture can be removed very effectively by washing, followed once again by phase separation. In this embodiment, it is preferred to use washing agents which are miscible with the original liquid phase, but which can be separated again from the latter in a simple manner, e.g. by distillation. Low-boiling liquids will generally be used for this purpose, which liquids are miscible with the introduced solvents or mixtures of solvents and non-solvents. They should also boil at a temperature so much lower than that of the liquids used for the dissolving operation that they may be recovered and also so that the solvent which has been washed out can be recovered. Such recovery methods are well known.

(4) Drying

It has been found that the agglomerate structure which is formed in the precipitation and which can be easily broken up is best maintained in this phase by choosing a method of drying which quickly, but not too severely, extracts the residual liquid from the precipitated polypropylene. For example, drying in a heated air stream (heated to about 80° C.) with constant extraction by suction of the air enriched with liquid fractions has proved suitable. The shorter and more complete the drying at this stage, the better the final product. The main criterion as regards the choice of the drying conditions will be to protect as far as possible the peculiar nature of the grain agglomerates present, i.e. in particular not to produce any strong bonds between the granules.

(5) Mechanical Comminution

The quality of the material before this last important stage of the process according to the invention depends on the preliminary stages and their conditions. With careful working, the product can be in the form of loose coherent structures which have the appearance of snow crystals. These structures are easily broken up with application of moderate force. Technically this condition is generally not standardised. The individual grains and grain clusters stick firmly to one another and the product does not give the impression of being a powder or even extremely fine powder. It is a rather coarse, usually flaky product, but not brittle, being rather a viscous structure. If the process according to the invention has been followed, this material is however very suitable for being broken up in conventional grinding assemblies. Beater mills, ball mills and pin mills are suitable, or simple high-speed mixers for relatively small quantities. For continuous processing on a large industrial scale, conventional disc mills are desirable auxiliary means. If a single grinding step has not resulted in the required yield of powders of a given particle size, then this yield can be increased to the required value by another grinding. It is quite possible to obtain products in which more than 90% has a particle size below $74\mu$. This percentage can be further increased by the unground fraction being returned to the grinding process. On the other hand, by varying the solvent/non-solvent ratio and by the adaptation of the subsequent grinding, it is possible to obtain a product of which the particle size is predominantly above $74\mu$, for example, in the range from 100 to $400\mu$. It is obvious that any intermediate stage can be obtained.

(6) Screening

The ground dry material which contains only extremely small quantities, if any, of residual moisture, can then be subjected to a grading in a manner known per se by screening. The known air sifters are particularly suitable for this purpose.

The process according to the invention is economical, both in the mechanical and in the solvent stages. The recovery and re-use of the liquids used is possible by simple means without relatively large losses. There is thus disclosed a method for working up coarse polypropylene into extremely fine powders, which is suitable for use on a large industrial scale. A fact which is of great importance for the new process is that additives which are introduced into the polypropylene, for example stabilisers, remain in the polypropylene in a quantity sufficient for practical purposes, so that this processing method does not involve any deterioration of the high quality material.

EXAMPLE 1

1 Kg of polypropylene is dissolved in 15 liters of a mixture of 80 parts of perchlorethylene and 20 parts of methyl glycol at 130° C. The solution is then passed quickly at this temperature into a sheet metal container which is at room temperature, the top of which is covered. This is then left standing until the mass temperature inside the forming gel is about 80° C. The gel which has formed is then broken up and centrifuged until the residual solvent content is about 10%. The material is then left as a thin layer or bed to stand for 48 hours in air. The residual moisture then amounts to 2%. A sample of this material is then beaten with a simple kitchen mixer. The screen analysis shows that 58% of the flowable powder which has formed has a particle size below $74\mu$.

If the material produced in the same way is dried at the drying stage in an oven for 3 hours at 70° C. and is then treated similarly, the yield of particles with a size below $74\mu$ falls, but is still usually almost 50.

EXAMPLE 2

1 Kg of polypropylene is dissolved in a mixture of 10 parts of solvent and 3 parts of non-solvent at a temperature between 125° and 130°. The solvent is monochlorobenzene, and 2-propoxyethanol is used as the non-solvent. The solution is transformed into a gel, as in Example 1. The gel is then centrifuged, washed with an alcohol, and again centrifuged. After the product has been dried in air and beaten in a domestic mixer, 91% of the product are obtained having a particle size below $74\mu$. If drying in an oven at 50° C. is carried out instead of the drying in air, the extremely fine grain yield (below $74\mu$) then amounts to 78%. In both cases, the coarser fraction can be converted by a grinding in a conventional disc mill into a more finely divided product.

EXAMPLE 3

1 Kg of polypropylene is dissolved in 13 liters of a mixture of equal parts of perchlorethylene and 2-propoxyethanol and transformed into a gel state, as described in Example 1. The filtered and washed material is dried in air and then beaten in a domestic mixer. The yield of the powder with a particle size below 74μ amounts to 74%.

EXAMPLE 4

1 Kg of polypropylene is dissolved in 10 liters of perchlorethylene at a solution temperature of 130° C. The gel obtained in accordance with the procedure given in Example 1 is centrifuged. One part is dried in an oven at 50° C. and the other part is dried by being left in a thin layer in air for 36 hours. After beating with a domestic mixer, a powder is obtained which consists of 99% of particles below 200μ. With the oven-dried product, 43% are smaller than 74μ, while with the air-dried product, 40% are smaller than 74μ. Testing of the product under a microscope and comparison with the product obtained according to Example 3 shows a grain structure in which the individual grain is about 15 to 20 times larger than the grain of Example 3. The size of the individual granules in the grain structures produced in Examples 1 and 2 is approximately 4 to 8 times the grain of Example 3. The comparison values given here are related to the diameter of the respective approximately spherical grain (primary particles).

Figure 2:
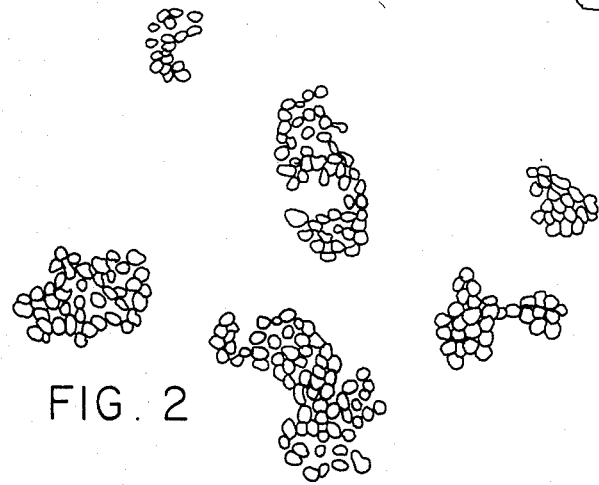
Figure 3:
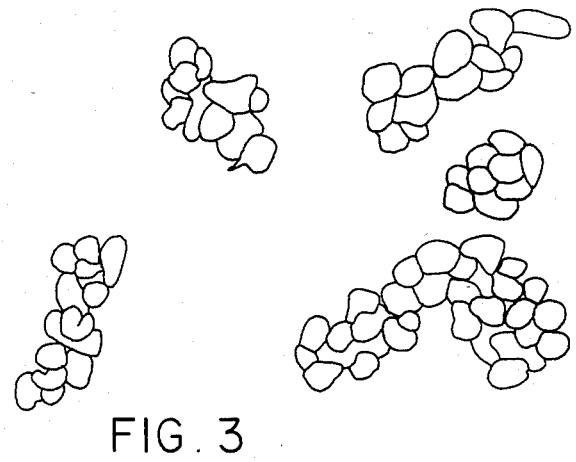

Microscopic representations of grain families which are formed by the process according to the invention are given in the accompanying FIGS. 1 to 3. FIG. 1 shows a product which has been obtained by using only a solvent for polypropylene. FIG. 2 shows a product which was obtained with a mixture of equal parts of solvent and non-solvent, while the product of FIG. 3 was produced from a solvent/non-solvent mixture in the ratio of 70:30 parts by weight.

What is claimed is:

1. A process for the production of finely divided polypropylene powders of grain size below 100μ which comprises the following steps:
   (a) dissolving polypropylene in a single liquid phase consisting of 45 to 95 parts of weight of perchlorethylene and 55 to 5 parts by weight of non-solvent of the polypropylene, said non-solvent being the methyl half ether of ethylene glycol, at a temperature above 115° C., employing a sufficient amount of said single phase liquid to completely dissolve said polypropylene and up to 20 liters of said single phase liquid per kg of polypropylene;
   (b) cooling this solution or allowing it to cool, under quiescent conditions, to a temperature below about 80° C. so that the polypropylene precipitates in the form of agglomerates of preformed individual particles of polypropylenes;
   (c) separating the precipitated polypropylene from the liquid phase and drying it; and
   (d) subjecting the dried polypropylene to mechanical comminution, said polypropylene being high molecular weight polypropylene as is produced with Ziegler catalyst, said high molecular weight polypropylene being one which during precipitation from solvents or a mixture of solvents and non-solvents is obtained as a non-pulverulous lumpy mass.

2. The process of claim 1 wherein said single phase mixture is composed of 60–80 parts by weight of perchlorethylene and 40 to 20 parts by weight of said non-solvent, and wherein said polypropylene is dried until it contains less than 10% of said single phase mixture.

3. The process of claim 1 wherein a single phase mixture of 70 parts by weight of solvent and 30 parts by weight of non-solvent for the polypropylene is used in step (a).

4. The process of claim 1 wherein at least 10 liters of said single liquid phase are used per kilogram of polypropylene.

5. The process of claim 1 wherein said polypropylene is dissolved, in step (a), at a temperature between 120° and 140° C.

6. The process of claim 1 wherein said solution formed in step (a) is transferred to a separate vessel for step (b) and wherein the temperature of said solution is kept above the precipitation point of the polypropylene until the solution has become quiescent.

7. The process of claim 1 wherein after the polypropylene has been precipitated, the precipitate is broken up by mechanical means before step (c).

8. The process of claim 1 wherein the precipitated polypropylene is separated from the solvent or solvent/non-solvent mixture by centrifuging.

9. The process of claim 1 wherein said polypropylene is dried until it contains less than 10% by weight of residual solvent.

10. The process of claim 1 wherein the separating in step (c) is effected by washing with a low boiling solvent.

11. The process of claim 1 wherein said drying in step (c) is effected by exposing a thin layer of the polypropylene to the atmosphere.

12. The process of claim 1 wherein said drying in step (c) is effected by heating the polypropylene.

13. The process of claim 1 wherein said comminution in step (d) is carried out using a beater mill, ball mill, pin mill or disc mill.

14. The process of claim 2, wherein said polypropylene is dissolved, in step (a) at a temperature between 120° and 140° C., and said solution formed in step (a) is transferred to a separate vessel for step (b) and wherein the temperature of said solution is kept above the precipitation point of the polypropylene until the solution has become quiescent.

* * * * *

UNITED STATES PATENT AND TRADEMARK OFFICE
CERTIFICATE OF CORRECTION

PATENT NO. : 4,510,305
DATED : April 9, 1985
INVENTOR(S) : Hans H. Körsgen, et al It is certified that error appears in the above-identified patent and that said Letters Patent is hereby corrected as shown below:

| | |
|---|---|
| 1st page under "Related U.S. Application Data", line 4; and Col. 1, line 9 | Delete "1968" and substitute --1978-- |
| 1st page under "Foreign Application Priority Data" | After "10518/67" insert --XII/39b-- |
| Col. 3, line 45 | After "particles," delete "it" |
| Col. 7, line 6 | After "10%" delete "," |

Signed and Sealed this

Third Day of September 1985

[SEAL]

Attest:

DONALD J. QUIGG

*Attesting Officer*    *Acting Commissioner of Patents and Trademarks - Designate*